(12) United States Patent  
Yokoyama (10) Patent No.: US 6,822,809 B2  
(45) Date of Patent: Nov. 23, 2004

(54) DRIVE TRANSMISSION DEVICE AND OPTICAL APPARATUS USING SAME

(75) Inventor: Akira Yokoyama, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 09/988,259

(22) Filed: Nov. 19, 2001

(65) Prior Publication Data

US 2002/0060856 A1 May 23, 2002

(30) Foreign Application Priority Data

Nov. 20, 2000 (JP) .......................................... 2000-353336

(51) Int. Cl.$^7$ .......................... G02B 15/14; G02B 7/02
(52) U.S. Cl. ...................................... 359/696; 359/824
(58) Field of Search ............................... 359/696, 819, 359/823, 824, 827; 396/133

(56) References Cited

U.S. PATENT DOCUMENTS

| | | | | |
|---|---|---|---|---|
| 4,909,622 A | * | 3/1990 | Konaya ..................... 353/26 R |
| 4,936,671 A | * | 6/1990 | Kaspar ........................ 359/877 |
| 5,335,115 A | | 8/1994 | Kawai et al. ................ 359/696 |
| 5,731,919 A | | 3/1998 | Yamamoto ................... 359/824 |
| 5,872,661 A | * | 2/1999 | Suzuki et al. ............... 359/698 |
| 6,025,964 A | | 2/2000 | Yamamoto ................... 359/824 |
| 6,580,571 B2 | * | 6/2003 | Sasaki et al. ............... 359/823 |
| 2002/0057503 A1 | * | 5/2002 | Imoaka et al. .............. 359/697 |

* cited by examiner

Primary Examiner—Huy Mai  
(74) Attorney, Agent, or Firm—Morgan & Finnegan, LLP (57) ABSTRACT

The invention provides an apparatus including an optical unit that movably supports an optical member driven by a manual-drive member, an input member driven by an actuator, an output member for transmitting drive of the input member and driving the manual-drive member, and a state switching unit for performing switching between a first state to transmit drive and a second state so as not to transmit drive in the input member and the output member, in which the input member and the output member are in contact with each other when the state switching unit is in the first state and in the second state.

52 Claims, 7 Drawing Sheets

DRIVE TRANSMISSION DEVICE AND OPTICAL APPARATUS USING SAME

BACKGROUND OF THE INVENTION

1. Field of the Invention

This invention relates to a drive transmission device, a lens unit using the drive transmission device, an optical apparatus that includes an imaging unit to which the lens unit is detachably mounted, and an optical-apparatus driving unit that is mounted to the lens unit using the drive transmission device.

2. Description of the Related Art

Figure 9:
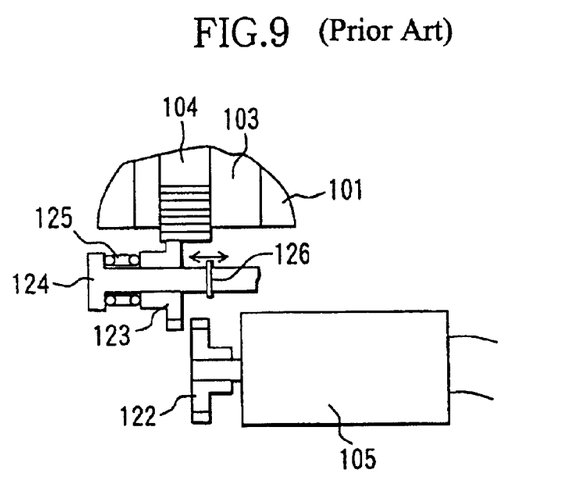
FIG. 9 is a sectional view showing the structure of a conventional clutch mechanism.

FIG. 9 shows the structure of a manually-operated part and an electrically-operated system of a conventional optical apparatus, such as that used for television shooting.

An operating ring 103 is rotatably disposed on the outer periphery of an apparatus body 101. An optical adjusting means, such as a movable lens group, not shown, that is disposed inside the apparatus body 101 can be driven by manual operation of the operating ring 103 or by electric operation from a drive unit mounted in the apparatus body 101.

A motor 105 and a control circuit used to electrically drive the operating ring 103 are housed in the drive unit. The motor 105 can be activated by operating an electric operation switch, or the like, that is disposed on the outer surface of the drive unit, and the optical adjusting means can be driven through the operating ring 103.

In the optical apparatus capable of manually and electrically driving the movable lens group, switching between manual drive and electric drive is carried out in most cases by manually operating a clutch mechanism provided with a switching lever.

In this clutch mechanism, an idler gear 123 slidable in the axial direction of a shaft 124 by the operation of the switching lever, not shown, is provided between an operating gear 104 formed on the operating ring 103 and an output gear 122 of the motor 105.

When electrically driven, the idler gear 123 is slid by the manual operation of the switching lever to a position where the idler gear 123 is engaged with the operating gear 104 and with the output gear 122, thereby transmitting the driving force of the motor 105 to the operating ring 103 through the idler gear 123.

When manually driven, the idler gear 123 is slid by the manual operation of the switching lever to a position where the idler gear 123 is disengaged from the output gear 122.

The switching between manual drive and electric drive is conventionally carried out such that a driving-force transmission path from the motor 105 to the operating ring 103 is turned on or off by manually operating the clutch mechanism, as described above.

However, in the optical apparatus in which the transmission path of motor power is turned on or off by operating the switching lever so as to achieve the switching between manual drive and electric drive as described above, the switching lever must be operated whenever the switching therebetween is carried out. Therefore, there is a problem in that operations become complex, and thus quick switching between manual drive and electric drive is made difficult.

Additionally, if the idler gear 123 and the output gear 122 are different in phase from each other when switched from manual drive to electric drive, the idler gear 123 is first pressed against the side surface of the output gear 122 by the urging force of the spring 125, and is caught there. Thereafter, when the output gear 122 begins to be driven by the motor 105, and the phase of the output gear 122 coincides with that of the idler gear 123, the gears mesh with each other, and the idler gear 123 is moved to a contact position with a stopper 126 by the urging force of the spring 125. As a result, switching to a proper electric-drive state is completed.

However, a problem resides in that an impulse sound occurs at this time because the idler gear 123 collides with the stopper 126 owing to the urging force of the spring 125.

Further, in actual shooting, there is a case in which, while being electrically driven, a cameraman attempts to forcibly stop the electric drive through the manual operation of the operating ring 103, or attempts to perform the manual operation in a direction opposite to the electric-drive direction, or attempts to increase or decrease the electric-drive speed.

However, a problem resides in that the aforementioned clutch mechanism has difficulty in the manual operation while being electrically driven.

As consideration, use can be made of an electromagnetic clutch in which the electricity supply to a coil is turned on or off so as to turn on or off the transmission path of the motor power, which is different from the clutch mechanism in which the switching is carried out through the lever operation.

Figure 8A:
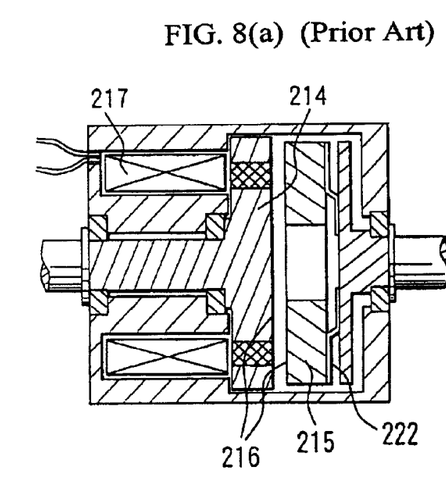
FIG. 8 shows sectional views of the structure of a conventional electromagnetic clutch.

FIG. 8 shows the inner structure of the electromagnetic clutch. (a) of FIG. 8 shows the electromagnetic clutch in which the electricity supply to a coil 217 is in an off-state. At this time, an armature 215 connected to the operating ring 103 through a gear train, not shown, is drawn by the urging force of a leaf spring 222 in a direction opposite to a rotor 214 to which a driving force is input from a motor not shown so that the frictional surface 216 of the rotor 214 and the frictional surface 216 of the armature 215 do not come in contact with each other.

Figure 8B:
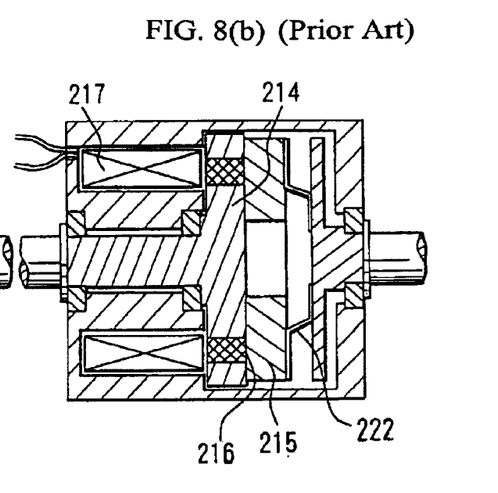

(b) of FIG. 8 shows the electromagnetic clutch in which the electricity supply to the coil 217 is in an on-state. At this time, a magnetic circuit is produced inside the electromagnetic clutch, and the armature 215 is drawn to the rotor 214 against the urging force of the leaf spring 222 and is brought into pressed contact with the rotor 214. Thereafter, engagement torque is generated in the electromagnetic clutch by the frictional force of the frictional surface 216, and the driving force of the motor can be transmitted to the operating ring 103.

However, if the electromagnetic clutch constructed as shown in FIG. 8 is used, the armature 215 moves in response to the switching between the ON and the OFF of the electricity supply to the coil 217 and collides with the rotor 214 or with the striking surface of the output shaft, and therefore a noise occurs.

Additionally, an electromagnetic force (i.e., coil voltage) that prevails against the urging force of the spring 222 is required in order for the armature 215 to come in contact with the rotor 214 by attraction. Therefore, delay arises during the period from the start of a command signal for performing the electric drive to the occurrence of the engagement torque resulting from the attractive contact of the armature 215 with the rotor 214.

Additionally, the coil voltage required to cause the armature 215 to come in contact with the rotor 214 by attraction is inconstant because, for example, of the individual differences of the electromagnetic clutch.

SUMMARY OF THE INVENTION

It is therefore an object of the present invention to provide a drive transmission device capable of preventing a sound from occurring when switched between the ON and OFF of the electricity supply, and capable of eliminating delay caused during the period from the beginning of the electricity supply to the engagement between an input member and an output member.

It is another object of the present invention to provide an optical apparatus or an optical-apparatus driving unit capable of easily, promptly, and quietly performing the switching between manual drive and electric drive by use of the aforementioned drive transmission device, and capable of smoothly performing the manual drive while being electrically driven.

In order to achieve the objects, according to the present invention, a drive transmission device for transmitting the drive of an actuator to a driven member comprises an input member which is driven by the actuator, an output member for transmitting the drive of the input member and driving the driven member, and a state switching unit for performing switching between a first state to transmit drive and a second state so as not to transmit drive in the input member and the output member, in which the input member and the output member are in contact with each other when the state switching unit is in the first state and in the second state.

Further, according to the present invention, an optical apparatus includes a drive transmission device for transmitting drive so as to manually drive an optical member by manually operating a manual-drive member and so as to electrically drive the optical member by transmitting electric drive from an actuator to the manual-drive member. The optical apparatus comprises an optical unit which movably supports the optical member driven by the manual-drive member, an input member driven by the actuator, an output member for transmitting the drive of the input member and driving the manual-drive member, and a state switching unit for performing switching between a first state to transmit drive and a second state so as not to transmit drive in the input member and the output member, in which the input member and the output member are in contact with each other when the state switching unit is in the first state and in the second state.

Further, according to the present invention, an optical apparatus includes a drive transmission device for transmitting drive so as to manually drive an optical member by manually operating a manual-drive member and so as to electrically drive the optical member by transmitting electric drive from an actuator to the manual-drive member. The optical apparatus comprises an optical unit which movably supports the optical member driven by the manual-drive member, an input member driven by the actuator, an output member for transmitting the drive of the input member and driving the manual-drive member, a state switching unit for performing switching between a first state to transmit drive and a second state so as not to transmit drive in the input member and the output member, a command unit for commanding the optical member to be electrically driven, which outputs command information in accordance with operation of a command operating member to the actuator, and a controller for controlling the state switching unit in accordance with the command information from the command unit, in which the input member and the output member are in contact with each other when the state switching unit is in the first state and in the second state.

Further, according to the present invention, an optical apparatus includes a drive transmission device for transmitting drive so as to manually drive an optical member by manually operating a manual-drive member and so as to electrically drive the optical member by transmitting electric drive from an actuator to the manual-drive member. The optical apparatus comprises an optical unit that movably supports the optical member driven by the manual-drive member, an imaging device to which the optical unit is detachably mounted and which has an image pickup device for picking up a subject image from the optical unit, an input member driven by the actuator, an output member for transmitting the drive of the input member and driving the manual-drive member, a state switching unit for performing switching between a first state to transmit drive and a second state so as not to transmit drive in the input member and the output member, a command unit for commanding the optical member to be electrically driven, which outputs command information in accordance with operation of a command operating member to the actuator, and a controller for controlling the state switching unit in accordance with the command information from the command unit, in which the input member and the output member are in contact with each other when the state switching unit is in the first state and in the second state.

Further, according to the present invention, an optical-apparatus driving unit mounted or connected to a body of an optical apparatus including an optical member includes a drive transmission device in which the optical member can be manually operated by manual operation input to a manual-drive member and in which the optical member can be electrically driven by transmitting electric drive from an actuator to the manual-drive member. The optical-apparatus driving unit comprises an input member driven by the actuator; an output member for transmitting the drive of the input member and driving the manual-drive member; a state switching unit for performing switching between a first state to transmit drive and a second state so as not to transmit drive in the input member and the output member; a command unit for commanding the optical member to be electrically driven, which outputs command information in accordance with operation of a command operating member to the actuator; and a controller for controlling the state switching unit in accordance with the command information from the command unit; in which the input member and the output member are in contact with each other when the state switching unit is in the first state and in the second state. Further objects and structures of the present invention will become apparent from description of embodiments provided later.

DETAILED DESCRIPTION OF THE PREFERRED EMBODIMENTS (First Embodiment)

Figure 1:
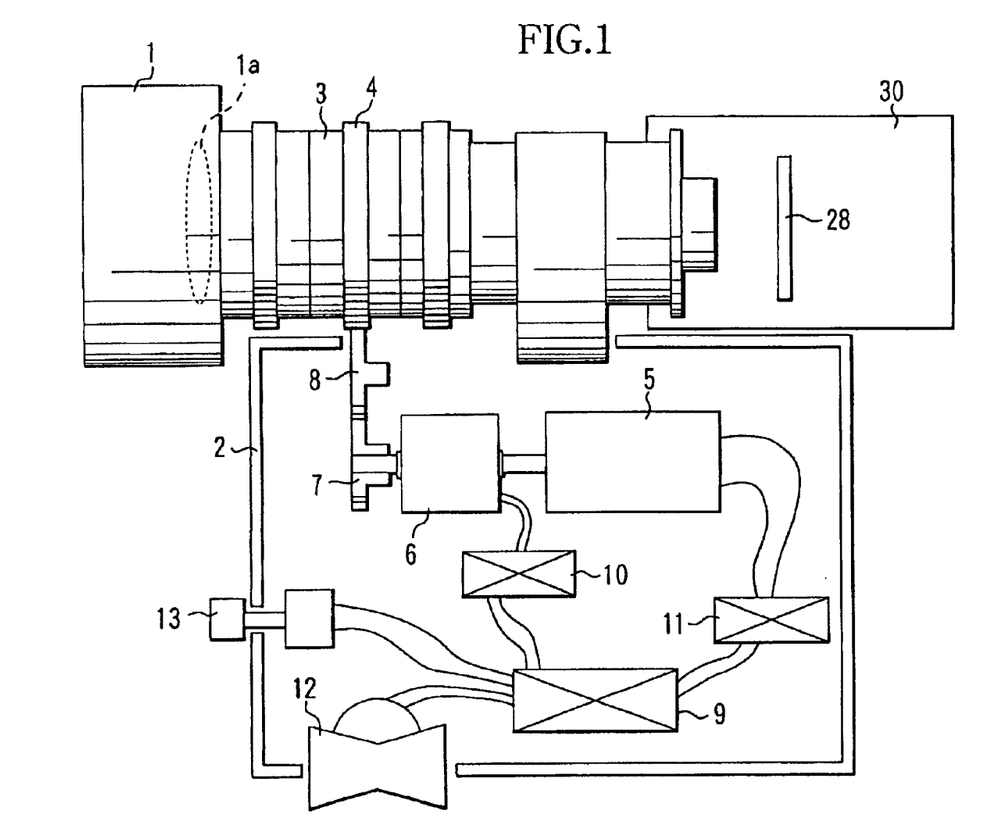
FIG. 1 is a schematic view showing the structure of a zoom lens body and a drive unit according to a first embodiment of the present invention.

FIG. 1 shows the structure of a zoom lens provided with an electromagnetic clutch, which is a drive transmission device according to an embodiment of the present invention. The zoom lens is composed of a zoom lens body 1 and a drive unit (optical-apparatus driving unit) 2 mounted or connected to the zoom lens body 1. The zoom lens body 1 and the drive unit 2 are united with each other through an idler gear 8.

The zoom lens is replaceably mounted to a television camera 30 and constitutes a camera system, which is an optical apparatus. The zoom lens forms a subject image on an image pickup device 28, for example, of a charge-coupled device (CCD) disposed in the camera 30.

The drive unit 2 includes an electric operation member 12 serving as a seesaw switch capable of being operated both in a plus direction and in a minus direction based on a predetermined position (i.e., midpoint). The electric operation member 12 outputs a command signal, which is command information, in accordance with the operation of the electric operation member 12. The output of the command signal is then input to a CPU 9.

A demand (not shown), which is an external operation device, can be connected to the drive unit 2 through a connector (not shown), and a command signal from an electric operation member disposed in the demand can be input to the CPU 9 through the connector.

On the other hand, a clutch driving signal from the CPU 9 is input to an electromagnetic clutch 6 through a clutch control circuit 10. A motor driving signal from the CPU 9 is input to a motor 5, which is an actuator, through a motor driving circuit 11.

The zoom lens body 1 is provided with a zoom driving ring (manual-drive member) 3 that can be manually operated. When the zoom driving ring 3 is manually operated, a zoom lens optical system 1a, which is an optical member in the zoom lens body 1, can be manually driven in the direction of its optical axis. The drive unit 2 has a volume 13 used as an adjusting member for adjusting a clutch driving signal to the electromagnetic clutch 6 and adjusting the engagement torque of the electromagnetic clutch 6.

Figure 2:
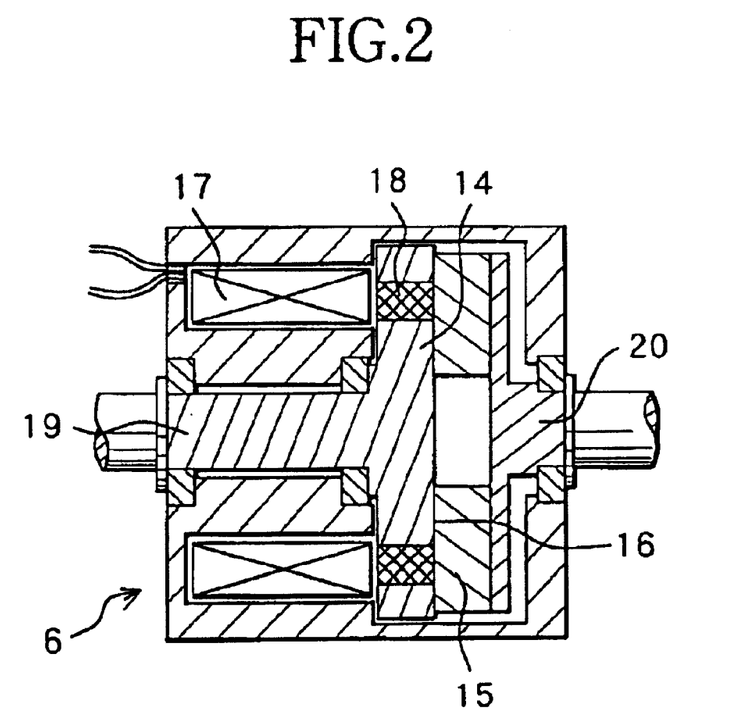
FIG. 2 is a sectional view showing the structure of an electromagnetic clutch disposed in the drive unit.

FIG. 2 shows the structure of the electromagnetic clutch 6 which is the drive transmission device. The electromagnetic clutch 6 includes a rotor 14 which is an input member fixed to an input shaft 19 extended from the motor 5, and an armature 15 which is an output member fixed to an output shaft 20 or engaged with the output shaft 20 not to move in the circumferential direction.

The rotor 14 and the armature 15 are made of iron or the like. A friction material 18 used also as a non-magnetic material is embedded in the rotor 14 like a ring. The rotor 14 and the armature 15 are assembled so that their contact surfaces 16 do not make a gap therebetween, i.e., so that they come in contact with each other.

When an electric current is passed through the coil 17, a magnetic circuit is produced in the electromagnetic clutch 6, and an attracting force acts between the armature 15 and the rotor 14. As a result, the contact surfaces 16 of the armature 15 and the rotor 14 are pressed against each other, and the rotor 14 and the armature 15 can be rotated together by the frictional force occurring on the contact surfaces 16.

When an electric current is not passed through the coil 17, an attracting force does not act between the rotor 14 and the armature 15, and therefore the contact surfaces 16 of the rotor 14 and the armature 15 are in contact with each other with such a pressure so as not to bring about drive transmission.

Thus, in the electromagnetic clutch 6 according to this embodiment, the rotor 14 and the armature 15 are in contact with each other regardless of whether an electric current is passed through the coil 17 or not. Therefore, since the armature 15 never moves when switching between the ON and OFF of the current supply is performed, sounds are prevented from occurring.

In the conventional electromagnetic clutch constructed as shown in FIG. 8 described above, the armature 215 is attracted to the rotor 214 against the force of the leaf spring 222 when a current is supplied, and therefore some voltage is needed to engage the armature 215 with the rotor 214. In other words, engagement torque is not generated until a certain degree of voltage is applied to the electromagnetic clutch, and, when a certain degree of voltage is reached, engagement torque corresponding to this voltage is suddenly generated.

By contrast, in the electromagnetic clutch 6 according to this embodiment, the contact surfaces 16 of the rotor 14 and the armature 15 are always in contact with each other, and a member like a spring by which the armature 15 is separated from the rotor 14 is unnecessary. Therefore, engagement torque is generated even when a voltage supplied to the electromagnetic clutch 6 is low. Therefore, the engagement torque can be smoothly controlled at a wide range.

As shown in FIG. 1, an output gear 7 is attached to the output shaft 20 so that it can be rotated together with the output shaft 20. The output gear 7 meshes with a driving gear 4 formed on the zoom driving ring 3 through the idler gear 8.

Accordingly, the rotor 14 and the armature 15 are attracted and pressed to each other in the electromagnetic clutch 6, and, when the motor 5 is driven, the driving force of the motor 5 is transmitted to the output shaft 20 through the rotor 14 and the armature 15. The driving force of the motor 5 is further transmitted to the zoom driving ring 3 through the output gear 7 and the idler gear 8 so as to rotate and drive the zoom driving ring 3. As a result, the zoom lens optical system 1a is electrically driven in the direction of the optical axis.

Although the rotor 14 is used as an input member, and the armature 15 is used as an output member in this embodiment, the rotor 14 may be used as an output member, and the armature 15 may be used as an input member.

Figure 3:
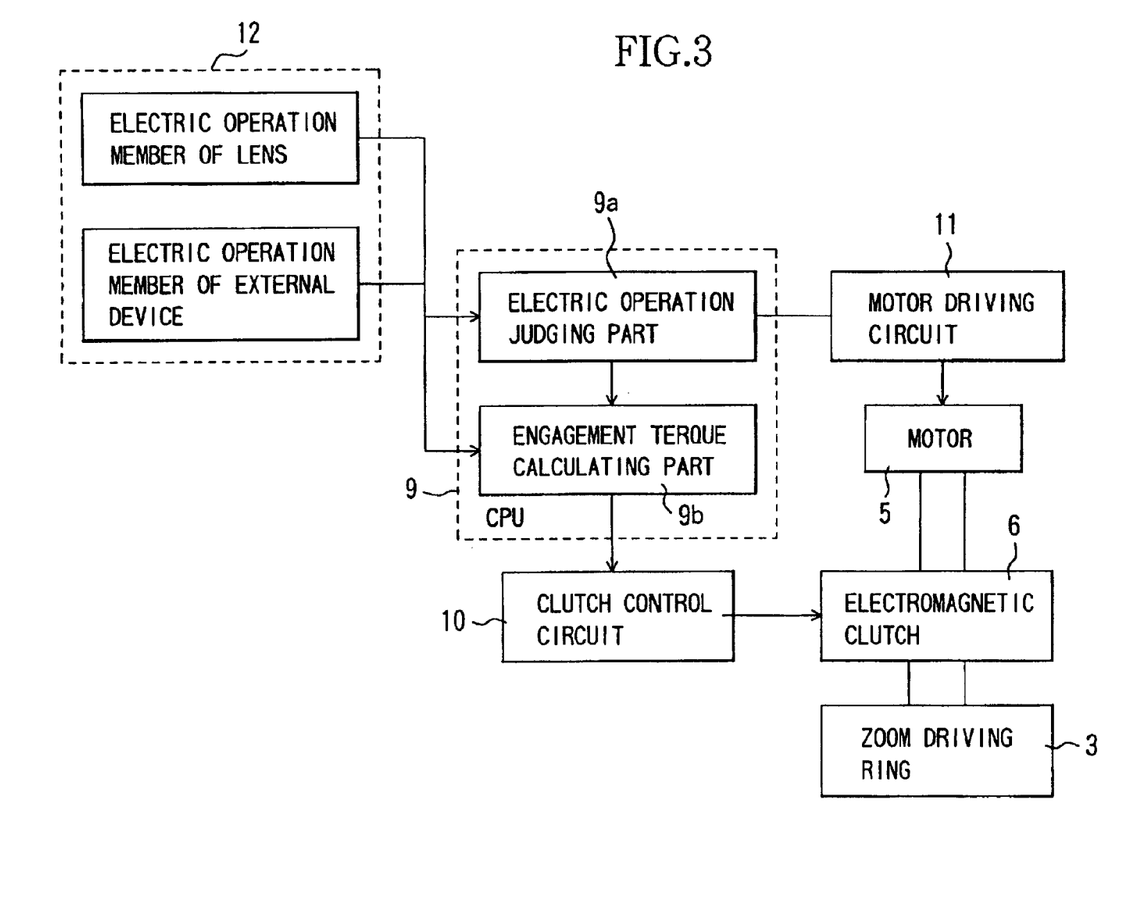
FIG. 3 is a block diagram showing the structure of the zoom lens body and the drive unit.

FIG. 3 shows the structure of a driving path of the drive unit 2. The electric operation member 12 or the electric operation member of the demand is operated, and a command signal whose output value changes according to the amount of its operation is output. The command signal is then input to an electric-operation judging part 9a and an engagement torque calculating part 9b disposed in the CPU 9. Herein, the command signal is a zoom-driving signal.

The electric-operation judging part 9a determines whether it is electric drive or manual drive in accordance with the output value of the command signal from the electric operation member 12.

Figure 4:
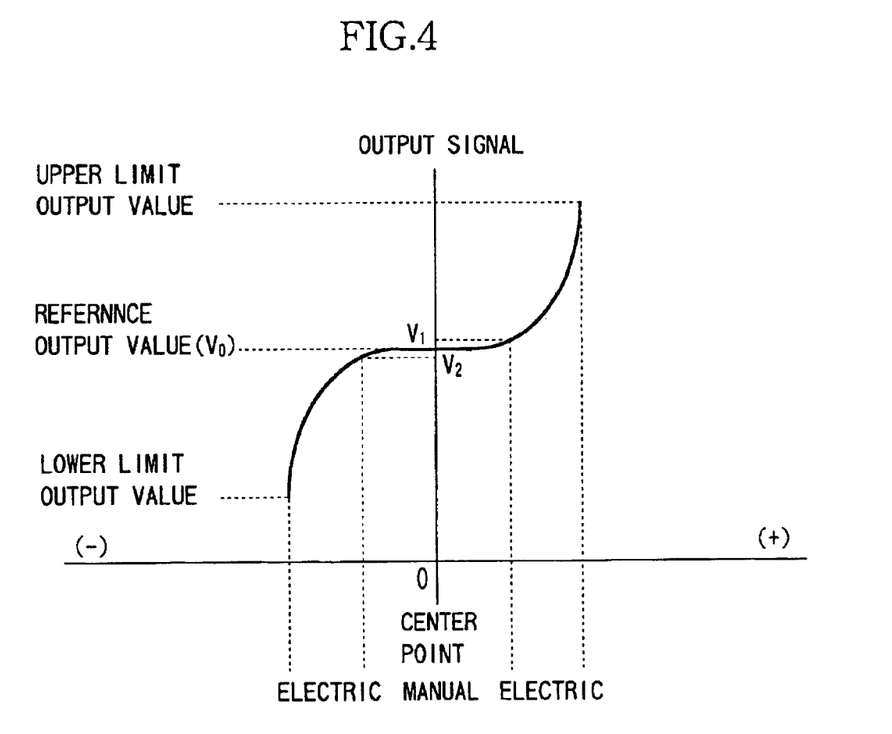
FIG. 4 is a graph showing a change in the output value of a command signal from an electric operation member disposed to the drive unit.

FIG. 4 shows a change in the output value of a command signal from the electric operation member 12. The output value of the command signal from the electric operation member 12 changes according to the amount of operation of the electric operation member 12 as shown in the figure. In more detail, a command signal with a reference output value Vo is output when the electric operation member 12 is not operated. A part where the output value does not change according to a small amount of operation is provided in the intermediate area between the plus side and the minus side with the operational center point of the electric operation member 12 therebetween. This part between V2 and V1 centering the reference output value Vo is a dead zone where the motor 5 does not work owing to the minimum starting voltage of the motor 5 or the load of the lens.

When the output value of the command signal is between V2 and V1, the electric-operation judging part 9a determines that it is manual drive. When the output value of the command signal is less than V2 or more than V1, the electric-operation judging part 9a determines that it is electric drive.

The command signal from the electric operation member 12 is also input to the engagement torque calculating part 9b of the CPU 9. The engagement torque calculating part 9b calculates engagement torque (i.e., transmitting force) needed by the electromagnetic clutch 6, and outputs a coil voltage necessary to generate engagement torque corresponding thereto from the clutch control circuit 10 to the electromagnetic clutch 6.

When judging that it is electric drive, the electric-operation judging part 9a outputs a motor-driving voltage, which corresponds to the output value of the command signal from the electric operation member 12, to the motor 5 through the motor driving circuit 11, and activates the motor 5.

At this time, the electromagnetic clutch 6 is engaged by the engagement torque corresponding to the output from the engagement torque calculating part 9b, and the rotation of the motor 5 is transmitted to the zoom lens optical system 1a through the zoom driving ring 3.

On the other hand, when judging that it is manual drive, the electric-operation judging part 9a stops outputting to the motor 5, and commands the engagement torque calculating part 9b not to supply an electric current to the electromagnetic clutch 6. Thereby, the electromagnetic clutch 6 reaches a state of non-current supply, and the contact surfaces 16 of the rotor 14 and the armature 15 are brought into such contact with each other so as not to generate engagement torque. In this state, the zoom driving ring 29 can be manually operated.

Figure 5:
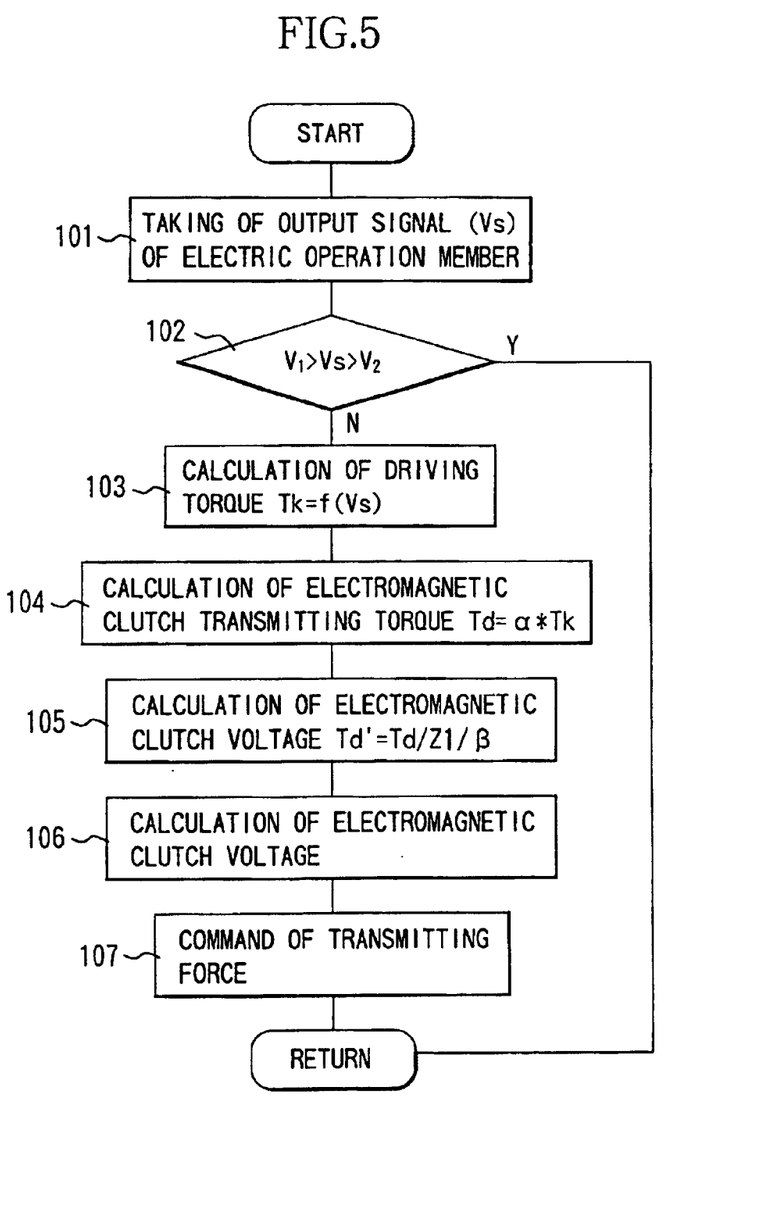
FIG. 5 is a flowchart showing the operation of a CPU disposed to the drive unit.

In this structure, referring to the flowchart of FIG. 5, a description will be provided of operations of the CPU 9 in a case where the electric operation member 12 is not operated (or the member 12 is operated within the range of the dead zone).

First, the output value (Vs) of a command signal from the electric operation member 12 is taken into the electric-operation judging part 9a at step 101.

Subsequently, a judgment is made as to whether the relation V1>Vs>V2 concerning the command signal Vs is established or not at step 102. Since the relation V1>Vs>V2 is established as shown in FIG. 4 in this case (i.e., manual drive), the flow is ended as it is.

At this time, the output value of a command signal from the electric operation member of the demand may also be taken into the electric-operation judging part 9a, and a judgment may be made in the same way as at step 102.

When judging that it is manual drive, the motor 5 does not work because there is no output to the motor driving circuit 11. When judging that it is manual drive, the engagement torque is set at "0" in the engagement torque calculating part 25b. Therefore, no voltage is supplied to the coil 17 of the electromagnetic clutch 6.

In other words, in FIG. 2, an electric current is not passed through the coil 17, and therefore no attracting force is generated between the armature 15 and the rotor 14. When the zoom driving ring 3 is manually operated and rotated in this state, the idler gear 8 meshing with this ring is rotated, and the output gear 7 and the armature 15 are rotated together.

Friction between the contact surface 16 of the rotor 14 and the contact surface 16 of the armature 15 and friction of the output shaft 20 against a bearing can hardly act as a load at this time, and the armature 15 can be freely rotated. Therefore, the zoom driving ring 3 can be manually operated almost without impairing the operational feel of manual operation.

Next, referring again to the flowchart of FIG. 5, a description will be provided of the operations of the CPU 9 in a case where the electric operation member 12 (or the electric operation member of the demand) is operated.

First, the output value (Vs) of a command signal from the electric operation member 12 is taken at step 101 of FIG. 5. If the electric operation member 12 is operated at this time (herein, let us assume that the member 12 is operated toward the plus side of FIG. 4), the output value Vs of the command signal of the electric operation member 12 becomes greater than V1, and therefore the relation V1>Vs>V2 is not established at step 102. Accordingly, the electric-operation judging part 9a determines that it is electric drive, and the process proceeds to step 103.

At step 103, driving torque (Tk) needed to drive the zoom lens optical system 1a through the zoom driving ring 3 is calculated, based on the output value (Vs) of the command signal, which has already been taken, from the electric operation member 12.

The driving torque is calculated as follows. The driving torque of a lens under various conditions is pre-measured, and the resulting numerical values are stored in an external or internal memory of the CPU 9 in the form of table data. Alternatively, the measured driving torque is expressed as an approximation formula, and factor data concerning it is stored in the memory. Necessary driving torque corresponding to the output of the electric operation member 12 is then calculated from the memory data by the use of the table data or the approximation formula.

Thereafter, necessary transmitting torque Td of the electromagnetic clutch 6 is calculated in accordance with the necessary driving torque Tk at step 104. In detail, the necessary driving torque Tk is multiplied by a safety factor $\alpha$ ($\alpha$=1.2 or 1.4, for example) with a margin so as to obtain the necessary transmitting torque Td.

Thereafter, engagement torque Td' of the electromagnetic clutch 6 needed to generate the necessary transmitting torque Td is calculated at step 105. The engagement torque Td' is obtained from the following equation:

$$Td' = Td/Z1/\beta$$

where Z1 is the reduction gear ratio from the output gear 7 of the electromagnetic clutch 6 to the driving gear 4 of the zoom driving ring 3, and $\beta$ is transmission efficiency from the output gear 7 to the driving gear 4.

Subsequently, supplied voltage (Vd) of the electromagnetic clutch 6 onto the coil 17 needed to generate the engagement torque Td' is calculated, and the resulting voltage is output to the electromagnetic clutch 6 at step 106.

When the voltage Vd is output to the electromagnetic clutch 6, the coil 17 is treated with the voltage as shown in FIG. 2, and a magnetic circuit is formed in the electromagnetic clutch 6. The armature 15 is then attracted to the rotor 14 owing to an electromagnetic force (attracting force) N generated by the magnetic circuit.

As a result, the engagement is established with the transmitting force (engagement torque) expressed by the following equation:

$$Td'=\mu \times N \times r$$

where $\mu$ is the friction coefficient between the rotor 14 and the armature 15, and r is an average radius of a contact part between the rotor 14 and the armature 15.

On the other hand, when judging that it is electric drive, a command signal from the electric operation member 12 is output from the electric-operation judging part 9a to the motor driving circuit 11, and the motor 5 rotates at a speed corresponding to the output value of this command signal.

Thereby, the rotation of the motor 5 rotating at a speed corresponding to the output value of the command signal is transmitted to the rotor 14 through the input shaft 19, and rotates the rotor 14 in FIG. 2.

As a result, the armature 15 attracted and engaged with the rotor 14 by the electromagnetic force is also rotated as described above, and the zoom driving ring 3 is rotated and driven through the output shaft 20, the output gear 7, and the idler gear 8. Accordingly, the zoom driving ring 3 and the zoom lens optical system 1a are electrically driven at a speed corresponding to the operational amount (i.e., command signal value) of the electric operation member 12.

Next, a description will be provided of a case where the zoom driving ring 3 is manually operated while the electric operation member 12 is being operated (herein, let us suppose that the zoom driving ring 3 is operated and rotated in a direction opposite to an electric drive direction).

First, the electric operation member 12 is operated, and the zoom ring is electrically driven in the same way as the above.

After that, the zoom driving ring 3 is manually rotated in the opposite direction against the rotating of the motor 5 while the zoom driving ring 3 is being electrically driven. Thereupon, since a sensor or a similar device is not provided for detecting the manual operation of the zoom driving ring 3, the electric-operation judging part 9a determines that it is a normal electric drive. As a result, the motor 5 is rotated as described above, and the electromagnetic clutch 6 is engaged by necessary engagement torque.

At this time, if the zoom driving ring 3 is manually and forcibly rotated in the opposite direction by torque Tsy greater than the transmitting torque Td, the armature 15 will be rotated in the opposite direction by greater manual operation torque Tsy', because the rotation of the zoom driving ring 3 is transmitted to the armature 15 through the idler gear 8, the output gear 7, and the output shaft 20. The manual operation torque Tsy' is expressed as follows:

$$Tsy'=Tsy/Z1/\beta$$

On the other hand, since the rotor 14 is connected to the motor 5 through the input shaft 19 and is rotated and driven by the motor 5, the rotor 14 and the armature 15 will be rotated in mutually opposite directions at the contact surface 16 of the electromagnetic clutch 6.

Referring to the torque relationship, generally, Tm>Td' and Td'>Tk' as mentioned above. Therefore, the relation Tm>Td'>Tk' is established where Tm is the maximum torque that the motor 5 can generate by which the rotor 14 is rotated and driven, and Tk' is driving-torque needed to drive the armature 15 that drives the zoom lens optical system 1a through the zoom driving ring 3. Further, since Tsy'>Td', both the rotor 14 and the armature 15 slide on the contact surface 16 of the electromagnetic clutch 6 and are at last rotated in mutually opposite directions.

This means that the zoom driving ring 3 can be manually operated without returning the electric operation member 12 to the operational center point while being electrically driven. The manual operation torque Tsy' needed at this time is slightly greater than the engagement torque Td'. Since the engagement torque Td' is calculated by adding a predetermined margin to the necessary driving torque Tk', the engagement torque Td' does not reach an extremely large value, and therefore torque needed when manually operated also does not reach such a large value.

Therefore, a comfortable operational feel can be obtained with respect to a case where the electromagnetic clutch 6 is engaged by engagement torque greater than the torque Tm in which the rotor 14 is rotated and driven by the maximum torque generated by the motor 5.

Further, since sliding occurs between the armature 15 and the rotor 14, an excessive load can be prevented from being imposed on the motor 5, etc., even when the zoom driving ring 3 or the idler gear 8 suddenly stops because of some trouble while being electrically driven.

There, a description was given of a case where the zoom driving ring 3 is manually operated in the direction opposite to the electric drive direction. However, the same applies to a case where the zoom driving ring 3 is manually and forcibly stopped while being electrically driven, or a case where the zoom driving ring 3 is manually braked to reduce the zoom speed, or a case where the zoom driving ring 3 is manually accelerated at a speed higher than the electric drive speed in the same direction as the electric drive direction.

(Second Embodiment)

In the first embodiment described above, a description was provided of a case where the electromagnetic clutch 6 is brought into a state of non-current supply (i.e., the engagement torque of the electromagnetic clutch 6 is fixed at "0") when the electric-operation judging part 9a determines that it is manual drive. However, the electromagnetic clutch 6 can be brought into a state of current supply, and slight torque can be given to the zoom driving ring 3 even when the judging part 9a determines that it is manual drive.

In more detail, voltage to engage the electromagnetic clutch 6 by engagement torque Td"($0 \leq$Td"<Tk'<Td') is supplied to the electromagnetic clutch 6 when the electric-operation judging part 9a determines that it is manual drive.

Thereafter, the zoom driving ring 3 is manually operated and rotated, thereby rotating the armature 15 through the idler gear 8, the output gear 7, and the output shaft 20. At this time, the armature 15 is engaged with the rotor 14 by the engagement torque Td", and the armature 15 is rotated while sliding on the rotor 14.

As a result, torque needed to manually operate the zoom driving ring 3 increases by an amount proportional to the engagement torque Td". Therefore, it is possible to load the manual operation of the zoom driving ring 3 to some degree, and to give an excellent manual operational feel to a cameraman who likes some load added to the manual operation.

Additionally, if the engagement torque Td" of the electromagnetic clutch 6 can be changed with the volume 13 which is an adjusting member, the load given when the zoom driving ring 3 is manually operated can be set in accordance by various inclinations of cameramen.

Figure 6A:
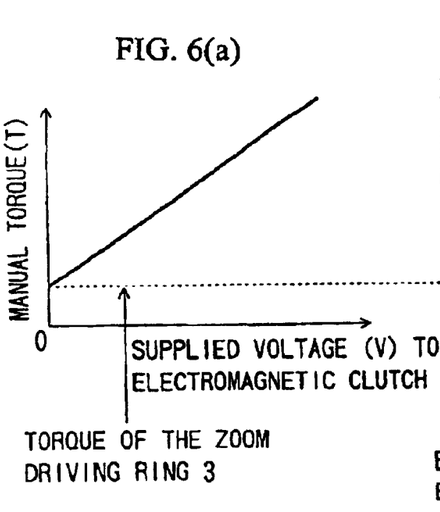
FIG. 6 shows graphs showing the relationship between voltage applied to an electromagnetic clutch and manual torque in a zoom lens body and a drive unit according to a second embodiment of the present invention.
Figure 6B:
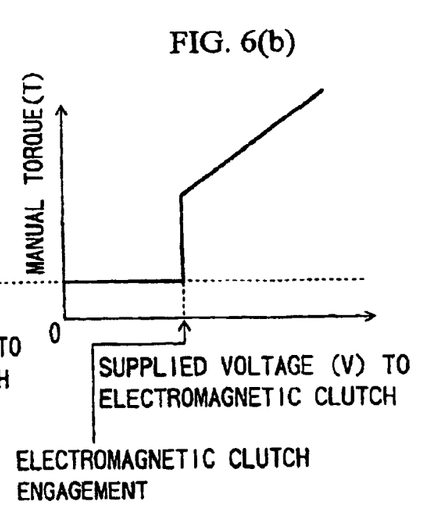

Referring again to the conventional electromagnetic clutch constructed as shown in FIG. 8 described above, since the armature 215 is attracted to the rotor 214 against the force of the leaf spring 222 when electricity is supplied, a certain degree of voltage is needed until the engagement torque is generated, and manual torque needed to drive the zoom driving ring, which includes the engagement torque needed when attracted, suddenly increases when the voltage supplied to the electromagnetic clutch reaches a given value as shown in (b) of FIG. 6.

By contrast, in the electromagnetic clutch 6 according to this embodiment, since the contact surfaces 16 between the rotor 14 and the armature 15 are designed to be always in contact with each other, manual torque needed to drive the zoom driving ring 3, which includes the engagement torque Td" of the electromagnetic clutch 6, increases proportionately with the voltage supplied to the electromagnetic clutch 6 as shown in (a) of FIG. 6, and the adjustment range of the manual torque is enlarged.

When the manual torque is adjusted and set, it can be set by an external adjusting device (e.g., personal computer) connectable to the lens apparatus, and not only by an adjusting means, such as the volume 13, mounted in the drive unit.

(Third Embodiment)

In the electromagnetic clutch 6 of the first and second embodiments, a lubricant may be applied onto the contact surfaces 16 of the rotor 14 and the armature 15. Grease with high viscosity is used as the lubricant.

Thereby, even if the rotor 14 and the armature 15 are in contact with each other when no electricity is supplied, or even if they are in pressed contact with each other when electricity is supplied, necessary manual torque acts on the zoom driving ring 3, and the contact surfaces 16 are smoothly slid, thus preventing a sliding sound from occurring, or preventing unsmoothness caused by friction from occurring. As a result, a manual operation feel can be improved.

(Fourth Embodiment)

In the electromagnetic clutch 6 of the first and second embodiments, an electrolytic plating or an electroless plating, which has excellent slidability and constitutes a contact surface with the rotor 14 or with the armature 15, may be treated on both of or one of the rotor 14 and/or the armature 15. The aforementioned grease, which is a lubricant, may be further applied onto the plated contact surface.

Thereby, likewise, even if the rotor 14 and the armature 15 are in contact with each other when no electricity is supplied, or even if they are in pressed contact with each other when electricity is supplied, necessary manual torque acts on the zoom driving ring 3, and the contact surfaces are smoothly slid, thus preventing a sliding sound from occurring, or preventing unsmoothness caused by friction from occurring. As a result, a manual operation feel can be improved.

(Fifth Embodiment)

Figure 7:
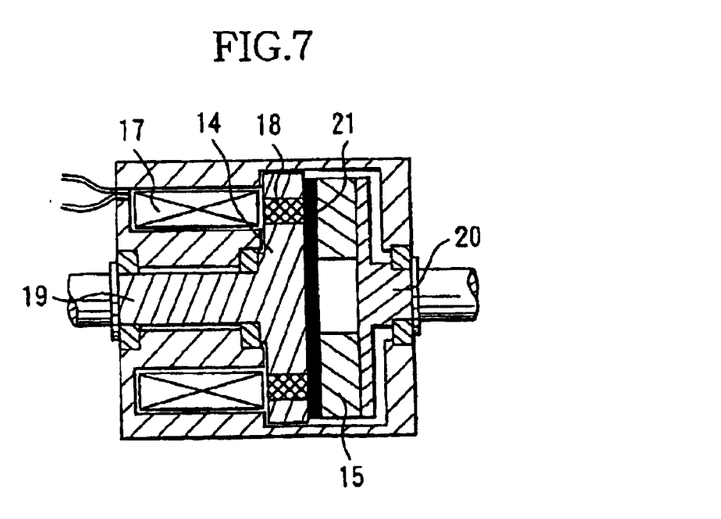
FIG. 7 is a sectional view showing the structure of an electromagnetic clutch used for a drive unit according to a fifth embodiment of the present invention.

In the electromagnetic clutch 6 of the first and second embodiment, an intermediate member 21, which is made of a material with excellent slidability and constitutes a contact surface with the rotor 14 or with the armature 15, may be attached to the rotor 14 or the armature 15, as shown in FIG. 7. The intermediate member 21 can be made of Teflon or polyethylene, for example.

Thereby, likewise, even if the rotor 14 and the armature 15 are in contact with each other when no electricity is supplied, or even if they are in pressed contact with each other when electricity is supplied, necessary manual torque acts on the zoom driving ring 3, and the contact surfaces are smoothly slid, thus preventing a sliding sound from occurring, or preventing unsmoothness caused by friction from occurring. As a result, a manual operation feel can be improved.

In each embodiment, a description was given of the zoom lens in which the drive unit 2 is mounted to the zoom lens body 1. However, the present invention is also applicable to a zoom lens in which a zoom lens body part and a driving system part are integrally contained in an outer casing and are mounted to a camera (however, a member equivalent to the zoom driving ring 3 can be manually operated).

Further, in each embodiment, a description was given of a case where the zoom lens optical system is electrically and manually driven. However, the present invention is applicable also to a case where a focus lens optical unit, which is an optical member other than the zoom lens optical unit, or a stop unit for adjusting the quantity of light is electrically and manually driven. In this case, a control member is operated, and a focus driving signal or a stop-driving signal is output as a command signal. The focus lens optical unit or the stop unit may be electrically and manually driven in response to each driving signal mentioned above.

Further, in each embodiment, a description was given of a case where the electric operation member of the lens or the demand is used as a command means. However, the command means of the present invention is not limited to this. For example, in an optical apparatus having an automatic variation function or an automatic focus function (AF), a signal generation circuit that generates and outputs a command signal for electric drive according to the automatic optical adjustment function may be used as a command means.

This is effective in another embodiment in which the focus lens unit is manually operated and driven while being electrically driven according to the automatic focus function. In this case, ON/OFF of the electricity supply to the electromagnetic clutch may be switched according to a judgment as to whether or not a command signal has been merely input, not according to a judgment as to whether or not a command signal exceeding a predetermined range has been input as in each embodiment.

Further, in each embodiment, a description was given of a case where the drive transmission device is applied to the zoom lens. However, the aforementioned drive transmission device can be used for optical apparatuses other than the zoom lens or for various devices other than the optical apparatus.

As described above, according to the aforementioned embodiments, the input member and the output member of the electromagnetic clutch are in contact with each other not only when an electricity is supplied but also when no electricity is supplied, and therefore it is possible to prevent the generation of a sound caused by the movement of a movable member as an armature of the input and output members when switched between a state of non-electricity supply and a state of electricity supply (e.g., generation of an impulse sound caused by a collision between the input member and the output member).

Further, the input and output members are not separated, for example, by a spring when no electricity is supplied, and therefore it is possible to generate engagement torque within a wide range without delaying from the beginning of the build-up of an electricity supply value when electricity is supplied.

If the contact surfaces of the input and output members are processed to have slidability by a lubricant, by an electrolytic plating, by an electroless plating, or by an intermediate member, some degree of slidability can be given between the input member and the output member that are always in contact with each other. Additionally, a sliding sound caused by the sliding of the input and output members or the unsmoothness caused by friction can be prevented from occurring.

In this case, the input and output members have slidability because, for example, of the lubricant, and a frictional force occurring on the contact surfaces becomes small when the electromagnetic clutch is brought into a state of electricity supply. However, in the electromagnetic clutch of the aforementioned embodiments, an element like a spring is not provided for applying a force so as to separate the input member from the output member, and therefore contact pressure (attracting force) between the input and output members is improved, and sufficient engagement torque can be obtained by supplementing an amount by which the frictional force is reduced.

Further, according to the aforementioned embodiments, the input and output members of the electromagnetic clutch, which are used for switching between manual drive and electric drive in the optical apparatus or the optical-apparatus driving unit, are in contact with each other not only when electricity is supplied but also when no electricity is supplied, and therefore it is possible to prevent the generation of a sound caused by the movement of a movable member as an armature of the input and output members when switched between a state of non-electricity supply and a state of electricity supply, and it is possible to promptly and quietly switch between manual drive and electric drive.

Further, the input and output members are not separated from each other, for example, by a spring when no electricity is supplied to the electromagnetic clutch, and therefore it is possible to generate engagement torque within a wide range without delaying from the beginning of the build-up of an electricity supply value when electricity is supplied, and it is possible to widely set a manual operational force when the electromagnetic clutch is brought into a state of electricity supply while being manually operated.

Further, according to the aforementioned embodiments, it is possible to prevent the generation of a sliding sound or the generation of unsmoothness caused by friction, and it is possible to improve a manual operational feel as a result of giving slidability to the contact surfaces of the input and output members by means, for example, of a lubricant when the manual-drive member is manually operated, or when the manual-drive member (i.e., optical member) is stopped, or when the optical member is accelerated or decelerated in a state where no electricity is supplied to the electromagnetic clutch, in a state where an electric driving force does not reach the input member in spite of the fact that an electric current is flowing though the electromagnetic clutch, or in a state where electricity is supplied to the electromagnetic clutch and, at the same time, an electric driving force reaches the input member.

Further, according to the aforementioned embodiments, the electromagnetic clutch is brought into the state of non-electricity supply when a command signal or a command signal exceeding a predetermined range is not input from the command unit that commands the electric drive of the optical member, whereas the electromagnetic clutch is brought into the state of electricity supply when a command signal or a command signal exceeding the predetermined range is input therefrom, and the electricity supply value for the electromagnetic clutch is set to be an electricity supply value corresponding to the command signal. Thereby, the electromagnetic clutch can automatically reach the state of electricity supply when a command signal or a command signal exceeding the predetermined range is input from the command unit, and the electromagnetic clutch can automatically reach the state of non-electricity supply when no command signal is input therefrom, and therefore the optical member can be electrically and manually driven without performing a special switching operation.

Additionally, the engagement torque of the electromagnetic clutch can be appropriately set to have a magnitude suitable for electrically driving the optical member. For example, electric power is prevented from being wastefully consumed resulting from the fact that the engagement torque is excessively set, and the motor, which is an actuator, can be protected by sliding the electromagnetic clutch when the optical member suddenly stops because of some trouble while being electrically driven.

Further, according to the aforementioned embodiments, the electricity supply value for the electromagnetic clutch is controlled to satisfy the relation $Tk'<Td'<Tm$, and the manual-drive member is manually operated so that the relation $Td'<Tsy'$ is satisfied, i.e., so that manual driving torque $Tsy'$ exceeding the engagement torque $Td'$ that has been set to be smaller than the maximum driving torque $Tm$ occurring at the input member is transmitted to the output member. Thereby, the optical member can be manually operated and driven while being electrically driven, and therefore the manual drive can be smoothly performed while being electrically driven.

Additionally, if the electricity supply value for the electromagnetic clutch is controlled to satisfy the relation $0 \leq Td''<Tk'$, it is possible to easily add a function by which, for example, operation torque needed to manually operate and drive the optical member is set according to the performance of a user.

Especially, if the electricity supply value for the electromagnetic clutch is controlled to satisfy the relation $0<Td''<Tk'$, it is possible to soften a shock to the manual operation that occurs from the fact that current electricity supply to the electromagnetic clutch is stopped, so that the engagement torque of the electromagnetic clutch suddenly reaches 0 when manually operated and driven while being electrically driven, in comparison with the case of the relation $0 \leq Td''<Tk'$.

What is claimed is:

1. A drive transmission device for transmitting drive of an actuator to a driven member, the drive transmission device comprising:

an input member which is driven by the actuator, the input member having an input contact surface; and an output member which transmits drive of the input member and drives the driven member, the output member having an output contact surface;

wherein the drive transmission device is switchable between a first state in which the drive of the input member is transmitted to the output member and a second state in which the drive of the input member is not transmitted to the output member, the input contact surface and the output contact surface are in contact with each other when the drive transmission device is in the first state and in the second state, and a contact pressure between the input contact surface and the output contact surface in the first state is larger than a contact pressure therebetween in the second state.

2. The drive transmission device according to claim 1, wherein the state switching unit is an electromagnetic clutch for generating an electromagnetic force by supplying electricity, the electromagnetic clutch bringing the input member and the output member into contact with each other with contact pressure by the electromagnetic force corresponding to an electricity supply value in the first state.

3. The drive transmission device according to claim 1, wherein the state switching unit is an electromagnetic clutch for generating an electromagnetic force by supplying electricity, the electromagnetic clutch bringing the input member and the output member into contact with each other with contact pressure by the electromagnetic force corresponding to an electricity supply value in the second state.

4. The drive transmission device according to claim 1, wherein the actuator is a motor.

5. The drive transmission device according to claim 1, wherein a lubricant to give slidability is applied onto the input contact surface and onto the output contact surface.

6. The drive transmission device according to claim 5, wherein the lubricant is grease.

7. The drive transmission device according to claim 1, wherein at least one of either the input contact surface or the output contact surface is treated with electrolytic plating or electroless plating to give slidability.

8. The drive transmission device according to claim 7, wherein a lubricant to give slidability is applied onto the contact surface.

9. The drive transmission device according to claim 8, wherein the lubricant is grease.

10. The drive transmission device according to claim 1, wherein an intermediate member to give slidability is provided between the input contact surface and the output contact surface.

11. The drive transmission device according to claim 10, wherein the intermediate member is made of at least one of either Teflon or polyethylene.

12. A zoom lens comprising
an optical member which is driven by the manual-drive member;
an actuator and;
a drive transmission device for transmitting drive of the actuator to the optical member,
wherein the drive transmission device comprises:
an input member driven by the actuator, the input member having a an input contact surface; and
an output member which transmits drive of the input member, the output member having an output contact surface;
wherein the drive transmission device is switchable between a first state in which the drive of the input member is transmitted to the output member and a second state in which the drive of the input member is not transmitted to the output member,
the input contact surface and the output contact surface are in contact with each other when the drive transmission device is in the first state and in the second state, and
a contact pressure between the input contact surface and the output contact surface in the first state is larger than a contact pressure therebetween in the second state.

13. The zoom lens according to claim 12, wherein the state switching unit is an electromagnetic clutch for generating an electromagnetic force by supplying electricity, the electromagnetic clutch bringing the input member and the output member into contact with each other with contact pressure by the electromagnetic force corresponding to an electricity supplying value in the first state.

14. The zoom lens according to claim 13, further comprising a controller for controlling an electricity supplying value for the electromagnetic clutch so as to vary contact pressure between the input member and the output member.

15. The zoom lens according to claim 12, wherein the optical member is a zoom lens unit.

16. The zoom lens according to claim 12, wherein the optical member is a focus lens unit.

17. The zoom lens according to claim 12, wherein the optical member is a stop unit.

18. The zoom lens according to claim 12, wherein the actuator is a motor.

19. The zoom lens according to claim 12, wherein a lubricant to give slidability is applied onto the input contact surface and onto the output contact surface.

20. The zoom lens according to claim 19, wherein the lubricant is grease.

21. The zoom lens according to claim 12, wherein at least one of either the input contact surface or the output contact surface is treated with electrolytic plating or electroless plating to give slidability.

22. The zoom lens according to claim 21, wherein a lubricant to give slidability is applied onto the contact surface.

23. The zoom lens according to claim 22, wherein the lubricant is grease.

24. The optical apparatus according to claim 12, wherein an intermediate member to give slidability is provided between the input contact surface and the output contact surface.

25. The optical apparatus according to claim 24, wherein the intermediate member is made of at least one of either Teflon or polyethylene.

26. An zoom lens comprising:
an optical member which is driven by a manual-drive member;
an actuator; and
a drive transmission device for transmitting drive of the actuator to the optical member,
wherein the drive transmission device comprises:
an input member driven by the actuator, the input member having an input contact surface; and
an output member which transmits drive of the input member, the output member having an output contact surface;
a command unit which commands the optical member to be electrically driven, the command unit outputting command information in accordance with operation of a command operating member to the actuator; and
a controller which controls the drive transmission device in accordance with the command information from the command unit;
wherein the drive transmission device is switchable between a first state in which the drive of the input member is transmitted to the output member and a second state in which the drive of the input member is not transmitted to the output member,
the input contact surface and the output contact surface are in contact with each other when the drive transmission device is in the first state and in the second state, and
a contact pressure between the input contact surface and the output contact surface in the first state is larger than a contact pressure therebetween in the second state.

27. The zoom lens according to claim 26, wherein the controller brings the state switching unit into the first state when there is no command information from the command unit or when command information does not exceed a predetermined range, whereas the controller brings the state switching unit into the second state when there is command information from the command unit or when command information exceeds the predetermined range.

28. The zoom lens according to claim 26, wherein the drive transmission is an electromagnetic clutch for generating an electromagnetic force by supplying electricity, the electromagnetic clutch bringing the input member and the output member into contact with each other with contact pressure by the electromagnetic force corresponding to an electricity supply value, and the controller controls an electricity supply value for the clutch in accordance with command information from the command unit.

29. The zoom lens according to claim 28, wherein the controller brings the electromagnetic clutch into a state of non-electricity supply when there is no command information from the command unit or when command information does not exceed a predetermined range, whereas, when there is command information from the command unit or when command information exceeds the predetermined range, the controller brings the electromagnetic clutch into a state of electricity supply and sets an electricity supply value for the electromagnetic clutch at an electricity supply value according to the command information.

30. The zoom lens according to claim 28, wherein the controller controls an electricity supply value for the electromagnetic clutch so as to satisfy the relation:

$$Tk' < Td' < Tm$$

where Tm is a maximum driving torque occurring at the input member driven by the actuator, Tk' is driving-torque needed to drive the output member that drives the optical member through the manual-drive member, and Td' is engagement torque corresponding to contact pressure between the input member and the output member.

31. The zoom lens according to claim 30, wherein the controller controls an electricity value for the electromagnetic clutch so as to satisfy the relation:

$$Td' < Tsy'$$

where Tsy' is manual driving torque transmitted from the manual-drive member to the output member through manual operation when the optical member is electrically driven by the actuator, thereby allowing the optical member to be manually driven while being electrically driven.

32. The zoom lens according to claim 28, wherein, when the optical member is not electrically but manually driven, the controller controls an electricity supply value for the electromagnetic clutch so as to satisfy the relation:

$$0 \leq Td'' < Tk'$$

where Tk' is driving torque needed to drive the output member that drives the optical member through the manual-drive member while being electrically driven, and Td'' is engagement torque corresponding to contact pressure between the input member and the output member when manually driven.

33. The zoom lens according to claim 32, wherein the controller controls an electricity supply value for the electromagnetic clutch so as to satisfy the relation:

$$0 \leq Td'' < Tk'.$$

34. The zoom lens according to claim 28, further comprising an adjusting member operated to vary engagement torque of the electromagnetic clutch, wherein the controller controls an electricity supply value for the electromagnetic clutch in accordance with operation of the adjusting member and varies the engagement torque when the optical member is manually operated.

35. The zoom lens according to claim 28, wherein the controller controls an electricity supply value for the electromagnetic clutch in accordance with operation of the manual-drive member by a user.

36. The optical apparatus according to claim 26, wherein the command unit has an operating member operated for commanding the optical member to be electrically driven, and the actuator that outputs command information in accordance with operation of the operating member works at a speed corresponding to the command information that varies in accordance with an operational amount of the operating member.

37. The zoom lens according to claim 26, wherein the optical member is a zoom lens unit.

38. The zoom lens according to claim 26, wherein the optical member is a focus lens unit.

39. The zoom lens according to claim 26, wherein the optical member is a stop unit.

40. The zoom lens according to claim 26, wherein the command information is a zoom driving signal.

41. The zoom lens according to claim 26, wherein the command information is a focus driving signal.

42. The zoom lens according to claim 26, wherein the command information is a stop driving signal.

43. The optical apparatus according to claim 26, wherein the actuator is a motor.

44. The zoom lens according to claim 26, wherein a lubricant to give slidability is applied onto the input contact surface and onto the output contact surface.

45. The zoom lens according to claim 44, wherein the lubricant is grease.

46. The zoom lens according to claim 26, wherein at least one of either the input contact surface or the output contact surface is treated with electrolytic plating or electroless plating to give slidability.

47. The zoom lens according to claim 46, wherein a lubricant to give slidability is applied onto the contact surface.

48. The zoom lens according to claim 47, wherein the lubricant is grease.

49. The zoom lens according to claim 26, wherein an intermediate member to give slidability is provided between the input contact surface and the output contact surface.

50. The zoom lens according to claim 49, wherein the intermediate member is made of at least one of either Teflon or polyethylene.

51. A camera system comprising:

an optical member which is driven by a manual-drive member;

a zoom lens which has the optical member;

a camera system to which the zoom lens is detachably mounted, the camera having an image pickup device which picks up an object image from the zoom lens;

an actuator; and a drive transmission device for transmitting drive of the actuator to the optical member;

wherein the drive transmission device comprises:

an input member driven by the actuator, the input member having an input contact surface;

an output member which transmits drive of the input member, the output member having an output contact surface;

a command unit for commanding the optical member to be electrically driven, the command unit outputting command information in accordance with operation of a command operating member to the actuator; and a controller which controls the drive transmission device in accordance with the, command information from the command unit;

wherein the drive transmission device is switchable between a first state in which the drive of the input member is transmitted to the output member and a second state in which the drive of the input member is not transmitted to the output member, the input contact surface and the output contact surface are in contact with each other when the drive transmission device is in the first state and in the second state, and a contact pressure between the input contact surface and the output contact surface in the first state is larger than a contact pressure therebetween in the second state.

52. An optical-apparatus driving unit mounted or connected to a body of an optical apparatus including a zoom lens and a manual-operating member which manually drives the zoom lens, the optical-apparatus driving unit comprising:

an actuator; and a drive transmission device for transmitting drive of the actuator to the optical member, wherein the drive transmission device comprises:

an input member driven by the actuator the input member having an input contact surface an output member which transmits drive of the input member, the output member having an output contact surface;

a command unit which commands the optical member to be electrically driven, the command unit outputting command information in accordance with operation of a command operating member to the actuator; and a controller which controls the drive transmission device in accordance with the command information from the command unit;

wherein the drive transmission device is switchable between a first state in which the drive of the input member is transmitted to the output member and a second state in which the drive of the input member is not transmitted to the output member, the input contact surface and the output contact surface are in contact with each other when the drive transmission device is in the first state and in the second state, and a contact pressure between the input contact surface and the output contact surface in the first state is larger than a contact pressure therebetween in the second state.

* * * * *

UNITED STATES PATENT AND TRADEMARK OFFICE
CERTIFICATE OF CORRECTION

PATENT NO. : 6,822,809 B2
APPLICATION NO. : 09/988259
DATED : November 23, 2004
INVENTOR(S) : Akira Yokoyama It is certified that error appears in the above-identified patent and that said Letters Patent is hereby corrected as shown below:

Col. 15 in Claim 2, line 2, delete "state switching unit" and insert --drive transmission device--.

Col. 15, in Claim 3, line 2, delete "state switching unit" and insert --drive transmission device--.

Col. 15 in Claim 12, line 2, delete "the manual-drive" and insert --a manual-drive--.

Col. 15 in Claim 13, line 2, delete "state switching unit" and insert --drive transmission device--.

Col. 16 in Claim 24, line 1, delete "optical apparatus" and insert --zoom lens--.

Col. 16 in Claim 25, line 1, delete "optical apparatus" and insert --zoom lens--.

Col. 17 in Claim 27, line 2, delete "state switching unit" and insert --drive transmission device--.

Col. 17 in Claim 27, lines 5-6, delete "state switching unit" and insert --drive transmission device--.

Col. 17 in Claim 28, line 2, after the word "transmission" insert --device--.

Col. 17 in Claim 33, line 4, delete "$0 \leq Td" < Tk'$" and insert --$0 < Td" < Tk'$--.

Col. 18 in Claim 36, line 1, delete "optical apparatus" and insert --zoom lens--.

Col. 18 in Claim 43, line 1, delete "optical apparatus" and insert --zoom lens--.

UNITED STATES PATENT AND TRADEMARK OFFICE
CERTIFICATE OF CORRECTION

PATENT NO.       : 6,822,809 B2
APPLICATION NO.  : 09/988259
DATED            : November 23, 2004
INVENTOR(S)      : Akira Yokoyama It is certified that error appears in the above-identified patent and that said Letters Patent is hereby corrected as shown below:

Col. 19 in Claim 51, line 17, delete "for commanding" and insert --which commands--.

Signed and Sealed this

Twentieth Day of May, 2008

JON W. DUDAS
*Director of the United States Patent and Trademark Office*